Feb. 14, 1956 J. J. MOJONNIER 2,734,621
CONVEYING MECHANISM
Filed April 17, 1951 3 Sheets-Sheet 3

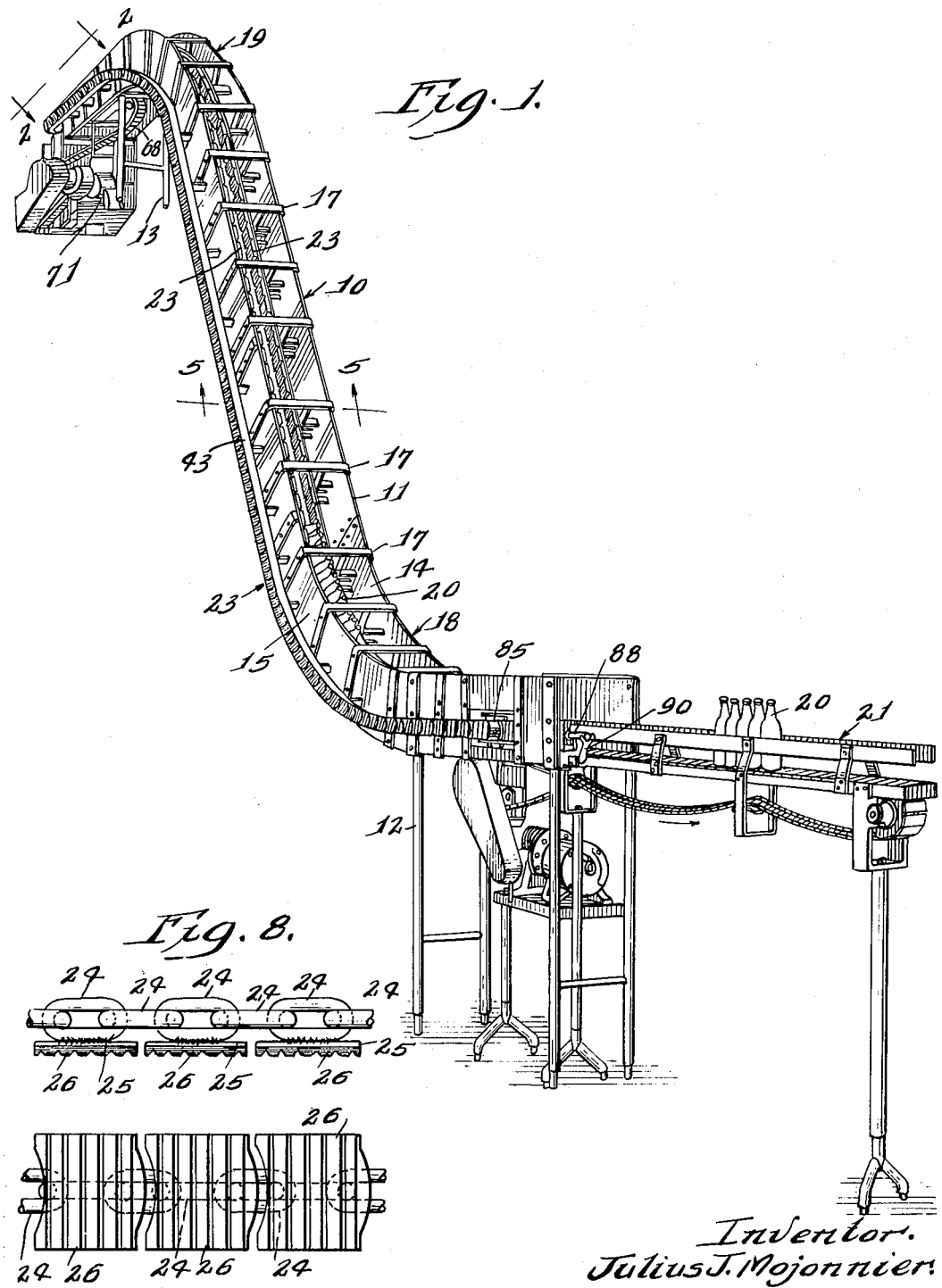

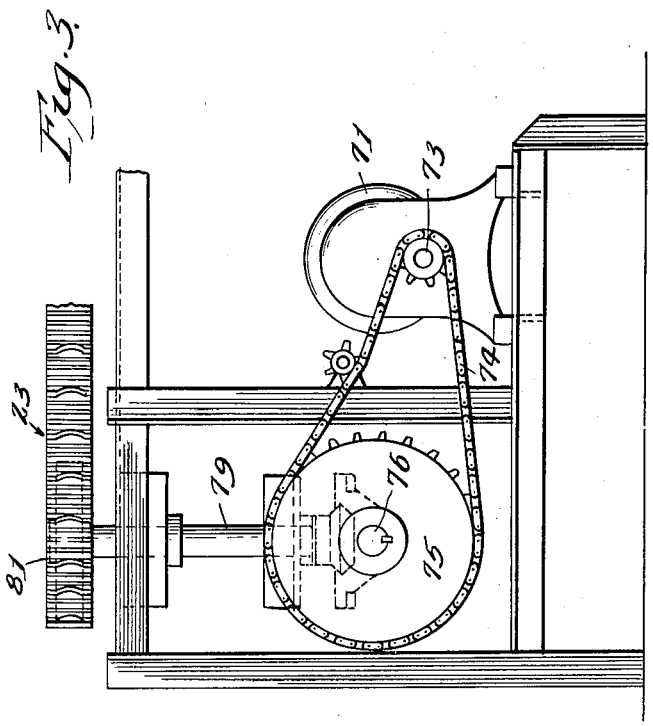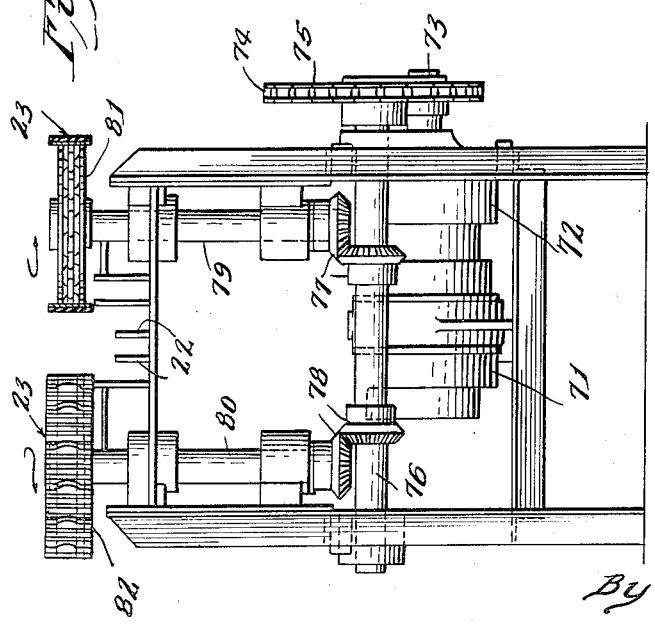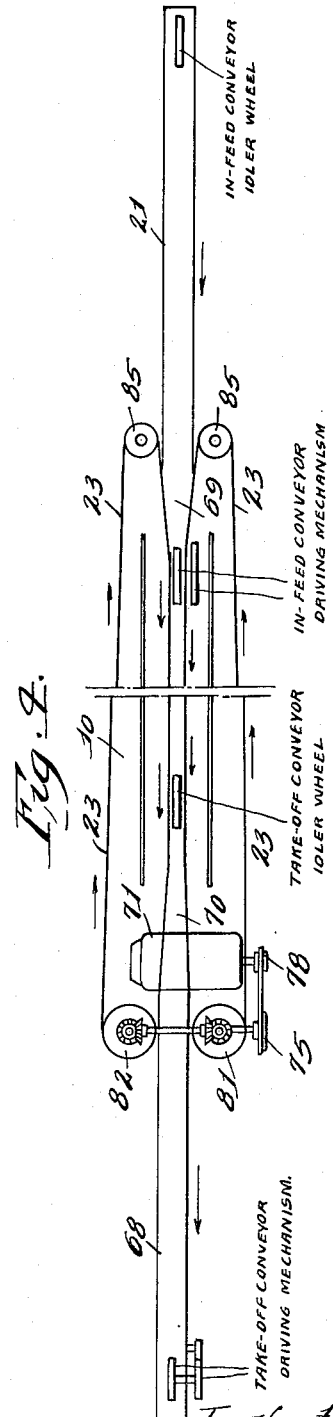

Inventor.
Julius J. Mojonnier,
By Victor M. Langsett.
Attorney.

United States Patent Office 2,734,621
Patented Feb. 14, 1956

2,734,621

CONVEYING MECHANISM

Julius J. Mojonnier, Winfield, Ill., assignor to Mojonnier Bros. Co., Chicago, Ill., a corporation of Illinois Application April 17, 1951, Serial No. 221,453

1 Claim. (Cl. 198—162)

This invention relates broadly to apparatus for conveying objects, such as bottles, cans and other containers, from one elevation to a higher elevation or, in reverse, from a higher to a lower level.

A particular adaptation or use of the apparatus is in association with a horizontal in-feed conveyor, in continuous operation at one level, and a horizontal take-off conveyor, in continuous operation at another level, whereby means of my invention containers carried on the in-feed conveyor are elevated or descend and are deposited on the take-off conveyor without interrupting the continuous flow of containers from one level to another.

Another object of my invention is to transfer objects, such as product containers, either empty or filled, from a moving conveyor at one level, and depositing such objects upon a moving conveyor at a different level in substantially the same arrangement and spaced relationship they maintained on the first conveyor.

Another object of my invention is to elevate or transfer objects from one level to another without damage to such objects being conveyed.

Numerous advantages, objects and novel features of the invention will be particularly mentioned or will become apparent from the further description herein.

Referring to the accompanying drawings:

Fig. 1 is a perspective view of my elevating conveying mechanism associated with in-feed and take-off horizontal conveyors;

Fig. 2 is a front view, with partial sectioning of one portion, of the driving mechanism for the elevating conveyor chain taken on the line 2—2 of Fig. 1;

Fig. 3 is a side view of the driving mechanism shown in Fig. 2;

Fig. 4 is a diagrammatic lay-out of the elevating apparatus associated with the in-feed and take-off horizontal conveyors as seen from above Fig. 1;

Fig. 8 is a side view of a portion of the elevating conveyor chain with attached plates; and Fig. 9 is a front view of a portion of the elevating conveyor chain with attached plates having a resilient facing as shown in Fig. 8.

Corresponding numerals of reference refer to like parts throughout the different views of the drawings.

In industrial operations, great economies can be effected by the mechanical handling of products and due to space limitations or arrangement of facilities it often becomes desirable to move the product from one floor to another. While in many instances such transfer can be accomplished by an ordinary inclined plane conveyor, frequently the inclination required is such that due to gravitational forces, the product cannot be moved without continuous gripping support. This is of particular importance where the product cannot be tumbled and it is desired to maintain the product's original position, substantially, in a continuous operation. For example, in a brewery where the filling operations are carried out on one floor and the bottles cased on an upper floor, my novel apparatus takes the bottles from the in-feed conveyor associated with the filling operation, and conveys them, upright, and in substantially the same spaced relationship and without interruption to the product flow, up a steep incline to the upper floor, where the bottles are transferred to a horizontal conveyor associated with the casing or other operations. During this ascent, the bottles are firmly gripped on their sides between two endless flexible conveyor chains, travelling in parallel, which prevent the bottles from tipping or piling up at the bottom of the incline.

While a detailed description of the invention follows, it is to be understood that the phraseology or terminology employed is for the purpose of description only and not of limitation beyond the requirements of the prior art. It is also to be understood that the invention is not limited in its application to the details of construction and arrangement of parts illustrated, since the invention is capable of other embodiments and of being practiced or carried out in various ways.

Figure 5:
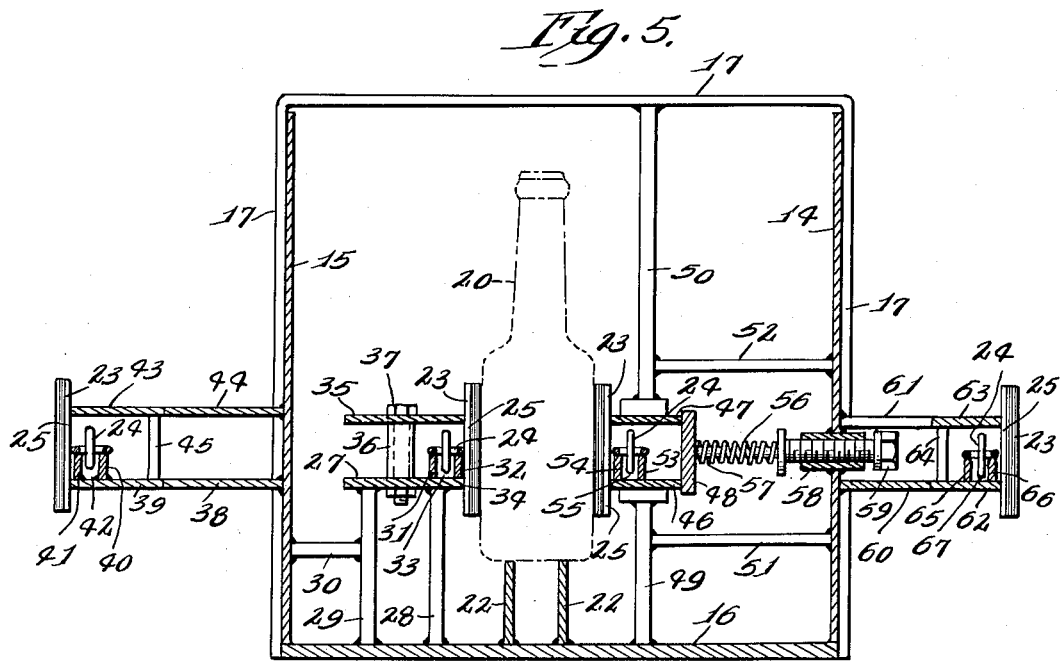
Fig. 5 is a cross-sectional detail of the elevating mechanism taken on the line 5—5 of Fig. 1.

Referring to the drawings and particularly Figs. 1 and 5, my elevating conveyor mechanism is designated generally as 10.

The main frame 11, which may be made of any suitable material and in any suitable size or form, is shown extended in somewhat goose-neck shape and resting upon the dual supporting legs 12 and 13. The frame 11, as shown, has sheet metal sides 14 and 15 and bottom 16, forming a trough, in cross-section, which is strengthened by the U-brackets 17, 17, placed at spaced intervals, attached to the sides 14 and 15, by rivets or other suitable means. The lower portion 18 and upper portion 19 of the inclined frame 11, are shaped in general to conform to segments of a suitable arc to facilitate the entry upon and departure from the conveyor incline of objects being carried thereon. The radii of such arcs will vary corresponding to the steepness of the incline to be negotiated by the conveyor.

Without limiting the generality of objects susceptible to conveyance, the bottles 20, 20, are fed into my elevating conveyor 10 by the associated horizontal in-feed conveyor 21, the bottoms of the bottles resting on the parallel rails 22, 22 attached, as by welding, perpendicularly, in spaced relationship to each other, to the bottom 16 of the main frame 11, the said rails 22, 22, extending longitudinally from the point of in-feed to the point of take-off and conforming to the general contour of the bottom 16. A soap solution or other suitable lubricant may be used to lessen the friction between the top of said rails and the bottoms of the bottles which glide upon said rails in their journey through the conveyor 10. It is obvious, if desired, that a moving conveyor chain or belt, synchronized with the general forward movement of the bottles, could be used instead of the rails 22, 22.

To in part carry and to transmit forward motion to the bottles, I grip the bottles between two flexible, endless conveyor chains 23, 23, supported in spaced relationship within and without the main frame 11 and moving in parallel within said frame 11. The chain 23 comprises (referring to Figs. 8 and 9) a plurality of chain links 24, 24, joined to form a continuous chain of great flexibility readily conforming to the sharp curves and contours of the supporting guides and sprockets hereinafter described. To each alternate link 24, I attach by any suitable means, such as welding, a metal face plate 25 perpendicular to the principal link plane, shaped to permit freedom of movement of the chain and yet provide a substantially continuous surface, as shown. To cushion the contact between the plate 25 and the bottles 20, a resilient substance, such as the rubber facing 26, may be attached to the plate 25, by any suitable means, such as vulcanizing. The conveyor chain 23 is more fully described and claimed in my co-pending application Serial No. 98,927, filed June 14, 1949, entitled "Conveyors" which is hereby referred to.

The conveyor chain 23, 23 is supported at a predetermined height or position in relation to the frame 11 on guide tracks, which may be placed wholly within or, as shown, partially within and without said frame. Referring to Fig. 5, the inner left-hand guide tracks are in fixed position and comprise the continuous guide track base 27 attached to and supported substantially parallel to the bottom 16 by the legs 28 and 29, further rigidity being given by the bracing member 30, and the continuous channel walls 31 and 32, attached in spaced relationship to each other to the upper surface of the member 17, by any suitable means, such as welding, forming the guide channel 33. The forward moving portion of the chain 23 is thereby retained in position, the lower portion of the vertical links 24 being disposed in said channel 33, and the horizontal links 24, of the chain 23, slidably resting upon the upper end surfaces of the channel walls 31 and 32, with the lower portion of the face place 25 abutting against the adjacent end surface 34 of the guide track base 27. In order to prevent distortion of the chain 23 and as an additional guide for the upper portion of the face plate 25 which it abuts, I provide the continuous bar member 35, supported in parallel with and spaced relationship from the guide track base 27 by any suitable means, such as the spacing sleeve 36 and bolt 37. The outer left-hand guide tracks supporting the returning portion of the endless conveyor chain 23 comprise the bracket 38 attached to the side 15 of the frame 11 substantially parallel to the bottom 16 and on substantially the same plane as the track base 27, at one end and secured at the other to the guide track base 39 to which are attached, as by welding, the continuous channel walls 40 and 41, in spaced relation to each other, forming the guide channel 42, in which the lower portion of the vertical links 24 are disposed, the horizontal links 24 slidably resting upon the upper surfaces of the said channel walls 40 and 41, with the lower portion of the face plate 25 abutting against the end surface of the track base 39. To guide the upper portion of the face plate 25, and to maintain the said face plate substantially parallel with the side 15 of the main frame 11, the abutting continuous bar member 43 is provided, and held in position, parallel with and in spaced relationship to the guide track base 39, by the attached bracing members 44 and 45.

In order to grip the bottles during ascension, one inner chain track is laterally movable under spring tension. As shown, the inner right-hand chain track comprises the continuous guide track base 46 and continuous bar member 47, parallel in spaced relationship to each other and the bottom 16, and rigidly attached to the vertical plate 48, and slidably guided by the vertical members 49 and 50, which are braced by the spacing strips 51 and 52, respectively. The chain track includes channel walls 53 and 54, attached, as by welding, in spaced relationship to each other, to the upper surface of the guide track base 46, forming the channel 55, in which travels the lower portion of the vertical links 24, the horizontal links 24 slidably resting upon the upper end surfaces of the channel members 53 and 54, with the upper and lower portions of the face plate 25 abutting and being guided by the adjacent end surfaces of the members 46 and 47, respectively. The slidable chain track guide assembly is resiliently biased toward and in contact with the articles being conveyed by means of a spring 56 whose inner end is held by a pilot post 57 on plate 48 and whose outer end is anchored on a spring compression adjustment assembly which includes an interiorly threaded sleeve 58 welded to wall 14 for co-operation with the adjusting screw 59. Similar spring tension is maintained at spaced intervals, preferably 16 inch centers, upon said inner chain track substantially throughout its length.

The outer return chain track is similar to that previously described for the opposite side of the conveyor and consists of the brackets 60 and 61, attached to the frame side 14 and the continuous guide track base 62 and continuous bar member 63, respectively, supported parallel to and spaced apart from each other, and further supported by the spacing plate 64, with the continuous channel walls 65 and 66 attached to the upper surface of the base 62, parallel and in spaced relationship to each other, forming the chain track channel 67, in which the lower portions of the vertical links 24 travel while the horizontal links 24 slide upon the upper end surfaces of the members 65 and 66. The face plates 25 are guided on the outer edges of the members 62 and 63, respectively.

As shown diagrammatically, in Fig. 4, the inner tracks of chains 23, 23 curve outwardly to a slight degree from a median center at the points of intake and exit, thereby forming throats designated generally as 69 and 70, exerting gradual increase in pressure, at the point of pickup of the bottles from the associated in-feed conveyor 21 and gradually releasing pressure at point of exit in delivery of the bottles to the associated take-off conveyor 68.

For driving the chain belts I provide at the upper end of the conveyor frame 10, a motor 71 (Figs. 2 and 3) which through a suitable reduction gear assembly 72 drives a chain sprocket gear 73, drive chain 74, sprocket gear 75, shaft 76, bevel gears 77 and 78, vertical shafts 79 and 80 and thereby the conveyor chain driving sprockets 81 and 82.

The shapes of the chain links are well shown in Figs. 8 and 9 and being of a familiar style, it will be recognized that the peripheries of the conveyor driving sprockets 81 and 82 are formed in a well known manner with recesses and projections adapted to co-operate with these chain links to positively drive them. By means of a reversing gear shift mechanism (not shown) or reversible motor, this conveyor may be used to carry articles either up or down between the other conveyors with which it is associated.

Figure 6:
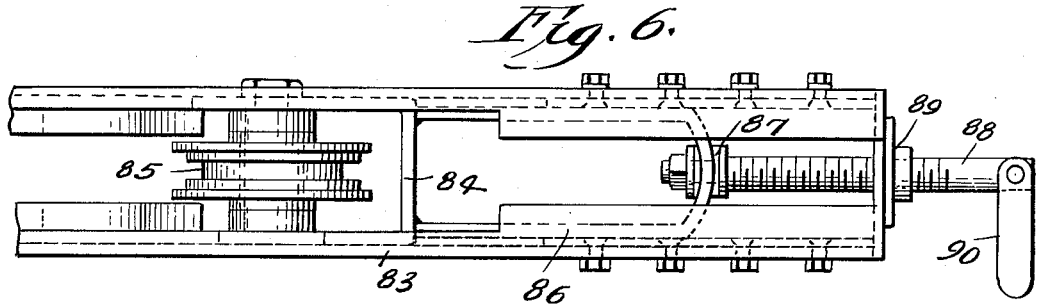
Fig. 6 is a side view of a yoke supporting the idler wheel for one of the elevating conveyor chains and chain tightening means.
Figure 7:
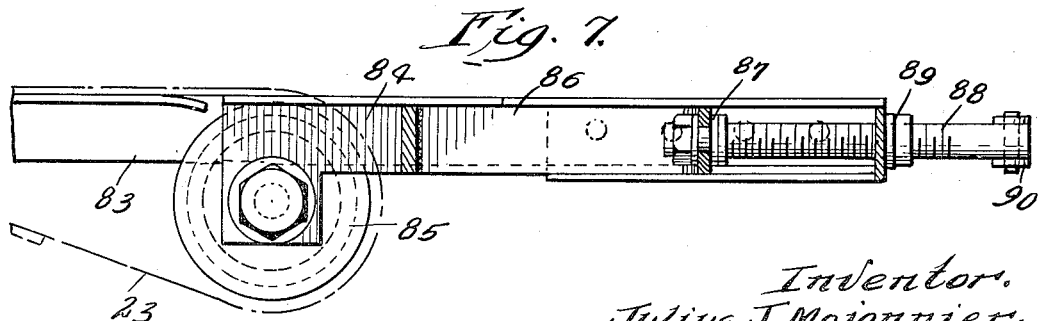
Fig. 7 is a top view of the same idler and tightening means shown in Fig. 6.

Conveyor chain tighteners are readily provided in the idler pulleys around which the chain belts travel at the end of the conveyor opposite from the driving sprockets. Figures 6 and 7 show such a tightener consisting of a frame generally indicated as 83 in which is slidably mounted a yoke 84 pivotally supporting an idler pulley 85. A U-shaped bracket 86 welded to the shoe carries a collar 87 to which the adjusting screw 88 is revolubly connected. The screw is threaded through a threaded collar 89 secured to the end of the frame 83 and by means of handle 90 the operator can adjust the tension on the conveyor belt. The screw 88 and handle 90 of this tightener mechanism are also indicated in Fig. 1.

In operation, shown diagrammatically in Fig. 4, the objects being transferred, are carried by the horizontal in-feed conveyor 21 into the throat 69 of my elevating conveyor mechanism designated generally as 10, where said objects are gripped and firmly held by the gripping plates 25, 25 on the moving conveyor chains 23, 23, travelling in parallel, one of said conveyor chains 23 being subject to constant spring pressure. The objects are thereby advanced upwardly, or downwardly in the case of reversed operation, curving gradually into and out of an inclined path and are delivered to the take-off conveyor 68, operating at a different level from the in-feed conveyor 21, at the throat 70, where the grip of the chains 23, 23 upon the objects is gradually released, so as not to tip said objects, such as bottles. The speed of the in-feed and take-off conveyors and my conveying mechanism are synchronized together to provide an orderly and continuous flow in the conveying operation.

It will now be appreciated that, while my conveyor can grip and convey articles of various shapes, it is especially well adapted to grip vertically extending narrow elongated articles, of which beer bottles are an example, whether spaced apart or closely grouped, and elevate or lower them through a steeply inclined path and deliver them in the same erect position. The length of the horizontal runs at both ends of this conveyor may be extended as much as desired, as will be apparent. It should also be understood that the conveyor chains 23, 23, are often commonly known and designated as chain belts, conveyor belts or simply as belts.

Having shown and described my invention, I claim:

In a conveying mechanism, a main frame having two horizontal portions, disposed in separated parallel planes, and an intermediate inclined portion; a pair of endless belts and driving means therefor, each belt including a chain of links alternately lying in vertical planes and horizontal planes normal to the vertical planes, each horizontal link having secured thereto an article gripping element maintained in vertically extending position; guide means supported in said frame maintaining courses of said belts in parallel opposed relation for gripping articles therebetween and guiding said courses through said horizontal portions and intermediate inclined portion of said frame comprising two vertical, spaced apart parallel channels walls, the lower portion of said vertical chain links being disposed in the channel between said walls and the alternate horizontal chain links slidably resting upon the upper margins of said walls; spaced apart parallel vertically disposed rails positioned in said frame between said article gripping courses for slidably supporting the bottoms of said articles; means contacting the surfaces of said gripping elements opposite their gripping surfaces comprising spaced apart parallel bar members which respectively contact said upper and lower surface portions of said gripping elements and with the said bar members associated with at least one article gripping course being slidably disposed; and spring actuated means in contact with at least one of said contacting means, yieldably urging it toward the associated belt maintaining continuous pressure thereon throughout the article gripping portion of said belts.

References Cited in the file of this patent

UNITED STATES PATENTS

| | | |
|---|---|---|
| 1,097,012 | Eldredge | May 19, 1914 |
| 1,720,680 | Kleinberg | July 16, 1929 |
| 1,748,456 | Panghorn | Feb. 25, 1930 |
| 1,883,666 | Flintjer | Oct. 18, 1932 |
| 2,092,916 | Hildebrand | Sept. 14, 1937 |
| 2,297,294 | Flintjer | Sept. 29, 1942 |
| 2,325,200 | Young | July 27, 1943 |
| 2,508,216 | Bonds et al. | May 16, 1950 |
| 2,689,638 | Mojonnier | Sept. 21, 1954 |

FOREIGN PATENTS

| | | |
|---|---|---|
| 441,077 | Great Britain | Jan. 13, 1936 |
| 505,133 | Great Britain | May 5, 1939 |